(12) United States Patent
Matsunaga

(10) Patent No.: US 12,113,201 B2
(45) Date of Patent: Oct. 8, 2024

(54) METHOD FOR MANUFACTURING ALL-SOLID-STATE BATTERY

(71) Applicant: MTEK-SMART CORPORATION, Yokohama (JP)

(72) Inventor: Masafumi Matsunaga, Yokohama (JP)

(73) Assignee: MTEK-SMART CORPORATION, Yokohama (JP)

( * ) Notice: Subject to any disclaimer, the term of this patent is extended or adjusted under 35 U.S.C. 154(b) by 457 days.

(21) Appl. No.: 17/415,316

(22) PCT Filed: Dec. 27, 2019

(86) PCT No.: PCT/JP2019/051614
§ 371 (c)(1),
(2) Date: Jun. 17, 2021

(87) PCT Pub. No.: WO2020/145214
PCT Pub. Date: Jul. 16, 2020

(65) Prior Publication Data
US 2022/0069287 A1    Mar. 3, 2022

(30) Foreign Application Priority Data
Jan. 9, 2019    (JP) .................................. 2019-002149

(51) Int. Cl.
*H01M 4/139* (2010.01)
*B05D 1/02* (2006.01)
(Continued)

(52) U.S. Cl.
CPC .............. *H01M 4/139* (2013.01); *B05D 1/02* (2013.01); *B05D 1/36* (2013.01); *B05D 7/24* (2013.01);
(Continued)

(58) Field of Classification Search
CPC .. H01M 4/139; H01M 4/0404; H01M 4/0419; H01M 4/366; H01M 4/624;
(Continued)

(56) References Cited

U.S. PATENT DOCUMENTS

2010/0075219 A1    3/2010  Iwaya et al.
2011/0143018 A1*   6/2011  Peng ................... H01M 10/052
                                                       427/78
(Continued)

FOREIGN PATENT DOCUMENTS

| CN | 102460775 A | 5/2012 |
|---|---|---|
| CN | 105449155 A | 3/2016 |

(Continued)

OTHER PUBLICATIONS

International Search Report issued on Mar. 10, 2020 in corresponding International application No. PCT/JP2019/051614; 4 pages.
(Continued)

*Primary Examiner* — Christopher W Raimund
(74) *Attorney, Agent, or Firm* — Maier & Maier, PLLC

(57) ABSTRACT

A high-density layer can be formed and adherence increased by causing a slurry formed primarily from an electrode active material and a solvent and a slurry formed primarily from electrolyte particles and the solvent to alternately collide with a subject material with an impact force and to adhere and be layered thereon in thin film. A slurry formed primarily from a conductive additive and the solvent is separately created and is coated in a dispersed manner in a small quantity at a desired position. Carbon residue is eliminated or greatly reduced and battery performance improved by eliminating a binder or greatly reducing the binder content.

11 Claims, 4 Drawing Sheets

(51) Int. Cl.
- *B05D 1/36* (2006.01)
- *B05D 7/00* (2006.01)
- *B05D 7/24* (2006.01)
- *H01M 4/04* (2006.01)
- *H01M 4/36* (2006.01)
- *H01M 4/62* (2006.01)
- *H01M 10/052* (2010.01)
- *H01M 10/0562* (2010.01)
- *H01M 10/0585* (2010.01)

(52) U.S. Cl.
CPC ............... *B05D 7/54* (2013.01); *B05D 7/58* (2013.01); *H01M 4/0404* (2013.01); *H01M 4/0419* (2013.01); *H01M 4/366* (2013.01); *H01M 4/624* (2013.01); *H01M 10/052* (2013.01); *H01M 10/0562* (2013.01); *H01M 10/0585* (2013.01); *H01M 2300/0068* (2013.01)

(58) Field of Classification Search
CPC ........... H01M 10/052; H01M 10/0562; H01M 10/0585; H01M 2300/0068; H01M 4/621; B05D 1/02; B05D 1/36; B05D 7/24; B05D 7/54; B05D 7/58; B05D 3/12; B05D 2202/00; B05D 2252/02; B05D 5/12; Y02E 60/10; Y02P 70/50
See application file for complete search history.

(56) References Cited

U.S. PATENT DOCUMENTS

| | | |
|---|---|---|
| 2012/0064404 A1 | 3/2012 | Carlson |
| 2013/0209873 A1 | 8/2013 | Nagasaka et al. |
| 2017/0352923 A1 | 12/2017 | Iwano et al. |

FOREIGN PATENT DOCUMENTS

| | | | |
|---|---|---|---|
| CN | 108400387 A | | 8/2018 |
| EP | 1553654 A2 | | 7/2005 |
| JP | 2004119195 A | * | 4/2004 |
| JP | 2009301726 A | | 12/2009 |
| JP | 2010-93027 A | | 4/2010 |
| JP | 2012252833 A | * | 12/2012 |
| JP | 2014-212022 A | | 11/2014 |
| JP | 2017174805 A | | 9/2017 |
| WO | 2012/053359 A1 | | 4/2012 |
| WO | 2018134486 A1 | | 7/2018 |

OTHER PUBLICATIONS

Office Action issued on Mar. 8, 2024, in corresponding Chinese Application No. 201980088106.2, 16 pages.

* cited by examiner

METHOD FOR MANUFACTURING ALL-SOLID-STATE BATTERY

FIELD

The present invention relates to a method for manufacturing an all-solid-state battery being a laminated structure including a positive electrode layer, an electrolyte layer, and a negative electrode layer, which includes: preparing a slurry containing particles including active materials; forming both of the electrode layers; preparing a slurry containing electrolyte particles; forming the electrolyte layer. Although the following description of embodiments mainly refers to a method for manufacturing the all-solid-state battery, this manufacturing method is suitable for storage batteries in general and can be applied to metal-air batteries which are considered to be a promising next-generation battery. The present invention relates to the method for manufacturing the all-solid-state battery, and in detail to an electrode formation method in which a slurry containing electrode active material particles and a slurry containing electrolyte particles or fibers are applied directly to an object. The application according to the present invention is not limited to any particular method, but includes the application of particles or fibers to an object to be applied, such as electrostatic atomization (including fiberization), atomization (including fiberization) including spraying, inkjet, dispensing, curtain coating, screen printing, slit die (slot nozzle) coating, and roll coating, which also include microcurtain application. The microcurtain is a method for applying a part of liquid film before it becomes a mist, at a relatively low pressure of around 0.3 MPa using a spray nozzle such as an airless spray nozzle with a wide angle pattern, in which the spray nozzle moves relative to an object to be applied, whereby no overspray particles are generated on the applied surface. This method utilizes the characteristics of the mist that passes through an object to be applied and changes to a mist as the distance from the object increases. In addition to particulation by spraying, atomization (fiberization) includes applications of liquid containing solid fine particles by dispersing the liquid with ultrasonic waves, or particulizing or fiberizing the liquid by spinning such as electrospinning or centrifugal force of a rotating body. It also includes a method for generating particles or fibers from liquid by an application of a meltblown method, which is related to a method for attaching or applying it to an object with an compressed air assist since the directionality of atomized particles is unstable in the aforementioned ultrasonic and centrifugal atomization. In the present invention, these are collectively described below as a splay.

BACKGROUND

As mobiles and electric vehicles increase, there is a need for quick charging of secondary batteries including lithium batteries, but tens of minutes are required for filling in electric vehicles. Because of the length of time, safety risks and the like, development to change electrolyte from liquid to solid is underway to reduce 80% filling time to a few minutes.

Patent Document 1 proposes a method for manufacturing an all-solid-state battery being a layered structure including a solid electrolyte layer, a positive electrode active material layer, and a negative electrode active material layer, and introduces a technology for forming electrodes, including: preparing a slurry containing materials for constituting the layered structure; forming a green sheet; forming integrally the green sheet and a sheet having asperities that disappears when heated; forming the asperities on the surface of the green sheet; heating the integrally formed green sheet and the sheet to disappear the sheet material, and firing the green sheet to form asperities on base material.

Patent Document 2 proposes a polyvinyl acetal resin for an electrode slurry containing active material particles, solvent and binder and for an electrolyte slurry containing electrolyte particles, solvent and binder, to form electrode layers and electrolyte layers for an all solid state battery and for laminating them, which can be debindered in a short time at low temperature. More specifically, a solid electrolyte slurry and a negative or positive electrode slurry are applied on a support layer of mold-release treated PET film, the PET film is peeled off after drying at 80° C. for 30 minutes, the electrolyte layer is sandwiched between the negative and positive electrode active material layers and then heated and pressurized at 80° C. and 10 kN to obtain a laminated structure, and conductive paste containing acrylic resin is applied on a stainless steel plate to make a current collector, and it is fired at 400° C. or lower under a nitrogen gas atmosphere to debinder the binder.

In the method disclosed in Patent Document 1, the active material slurry and electrolyte slurry are applied to a sheet of polyvinyl alcohol or the like with asperities, which is ideal because of the increased contact area of the active material and electrolyte layers, but the resin content needs to be disappeared at high temperatures for a long time, for example, 50 hours at 700° C. Patent Document 2 has a problem that volatilizing the solvent in the slurry takes 30 minutes at 80° C., so manufacturing lines for lithium-ion batteries would have to be much longer in order to maintain the current line speed of 100 m/min, or the line speed would have to be reduced. In both methods, when the binder in the slurry is eliminated or reduced, particle precipitation occurs at points where the slurry tended to stagnate in the general circulation system, and the application could not be performed with a die head used for electrode formation in lithium batteries.

Patent Documents

Patent document 1: WO2012/053359A
Patent document 2: JP2014-212022A

SUMMARY

The purpose of the present invention is to improves productivity, to eliminate or minimize residual carbon generated during firing in a laminated structure that requires the firing, to improve adhesiveness of interface between the layers, and to widen the surface area of the interface between the electrode layer and electrolyte layer to lower the interfacial resistance and improve the battery performance. Although the electrode layer is formed by the application of a slurry prepared by mixing the electrode active material and the electrolyte particles or fibers, even if the mixture is well dispersed, agglomeration will occur over time, resulting in performance degradation. In the present invention, various types of sulfides and oxides can be used for solid electrolyte particles. Various types of positive and negative active material particles can also be used. For example, if the electrolyte is sulfide, such as LPS, the positive electrode may be lithium sulfur (Li2S) particles or sulfur (S8), and the negative electrode may be graphite and silicon particles.

The purpose of the present invention is to solve the aforementioned problems, and to enable a slurry containing mainly a positive electrode active material and a slurry containing mainly electrolyte particles or short fibers and a solvent to be alternately laminated on a current collector in a thin film using an independent applying device in order to produce a high-quality all-solid-state battery. Similarly, a slurry containing mainly a negative electrode active material and a solvent and a slurry containing mainly an electrolyte and a solvent may be alternately applied to a current collector for a negative electrode in a thin film. Each slurry can be mixed with a solution or an emulsion, inorganic or organic particles or fibers such as PTFE or PVDF powder, electrolyte glass fibers or the like as a binder. The binder in particle form or fiber form may be dispersed with a solvent to make the slurry, which can be applied and laminated independently, alone and alternately with the slurry containing the active material and the electrolyte particles, if necessary. Although the applying device is not limited to the above, it is particularly effective that the slurry containing the particles and solvent, or the particles, solvent, and binder as a binding agent between the particles, is converted into particles by a spray or particle generator, the particles are impacted on an object with impact at the desired speed, and the particles are adhered to the object in a dense and strong manner after evaporation of the solvent. The object includes the positive electrode layer, the negative electrode layer, the electrolyte layer, and the current collector. In the case of attaching the electrode slurry particles, the object is the current collector or the electrolyte layer. In the case of attaching the electrolyte slurry particles, the object is mainly the positive and negative electrode layers. It also includes attaching the electrolyte particles to the current collector together with the positive or negative electrode active materials and the like to make an electrode.

The present invention provides a method for manufacturing an all-solid-state battery by forming electrodes layers on positive and negative current collectors for the all-solid-state battery, forming an electrolyte layer on at least one of the electrode layers, and sandwiching a positive electrode layer, the electrolyte layer, and a negative electrode layer between a positive electrode collector and a negative electrode collector and in close contact with each other or inserting the electrolyte layer between electrode layers to form a laminated structure, including: a preparing step; a lamination step; in which in the preparing step, the slurry containing electrode active material and solvent, and slurry containing electrolyte particles or electrolyte short fibers and solvent are prepared, and in the lamination step, at least two slurries are alternatively applied to the current collector in a thin film to stack each slurry so that two or more layers are formed.

The present invention provides the method in which 2 to 15 layers are formed in the lamination step.

The present invention provides the method in which the positive electrode slurry contains a conductive agent.

The present invention provides the method in which a conductive agent is prepared so as to be contained in an independent slurry and applied on the selected electrolyte particles or fibers or on active material particles in a state where particles or fibers of the conductive agent are dispersed so that the particles or the fibers of the conductive agent do not form a film.

The present invention provides the method in which the electrode slurry and/or electrolyte slurry contain an inorganic or organic binder.

The present invention provides the method in which the electrolyte layer is formed by laminating and applying the electrolyte layer slurry on the positive electrode layer or the negative electrode layer formed as the electrode or on porous sheet for the electrolyte in a thin film.

The present invention provides the method in which at least one of the electrode and electrolyte layer is formed by a spray method or the electrode or electrolyte layer is formed by converting the slurry into particles, and moving and applying the slurry in a particulate form on heated collector, electrode layer, and porous sheet of the object to be applied, and then volatilizing 95 percent or more of the solvent within five seconds after splayed particles or particles of the slurry adhere to the object.

The present invention provides the method in which spraying is done in pulses of 1 to 1000 Hz, the distance between the object and spray head is 5 to 60 mm, and impact of the spray particles of the slurry on the object causes the solvent to evaporate while the solvent and non-volatile components in the slurry are instantaneously separated.

The present invention provides the method in which the electrolyte is sulfide, an exhaust means is provided downstream of a booth for the electrode layer formation and electrolyte layer formation processes, and a dehumidification means is provided upstream thereof.

The present invention provides the method, further including: forming an negative electrode on the negative electrode collector, forming a positive electrode on the positive electrode collector, forming the electrolyte layer on the negative electrode collector or the positive electrode collector, or forming the electrolyte layer with a porous base material as a backbone to laminate the electrolyte layer between the negative electrode collector and the positive electrode collector.

The present invention provides the method in which the all-solid-state battery is manufactured in a roll-to-roll manner.

In the present invention, regardless of whether the electrolyte is sulfide or oxide, the amount of the binder in each slurry is preferably 10% or less of the total solid content by weight, especially when firing is performed in a subsequent process, and preferably 2% or less for reasons such as minimizing residual carbon. The presence of the binder makes it possible to create an electric potential difference between the target object and slurry or fine particles made by spraying, and to support the adhesion of the fine particles electrostatically. The application using the static electricity is particularly effective for the adhesion of ultra-fine particles having sub-micron size or smaller. In order to electrostatically charge the sprayed particles, the binder or solvent as described above should be selected to be easily charged by the static electricity.

According to the method for manufacturing the all-solid-state battery, splayed particles and the like are impacted and attached to the object with impact, so it is possible to form ultra-dense particle groups. In addition, the interface of the electrode can be easily formed with fine asperities or asperities having the desired size if necessary, so that the contact area with the electrolyte layer can be increased and an anchor effect can be used to improve adhesion and lower the interface resistance maximally.

In addition, a laminated structure can be formed to laminate the positive electrode layer, electrolyte layer, and negative electrode layer, all of which can be formed from particles made by spraying the slurry for electrodes and electrolytes, while moving the object and the spray head relative to each other, according to the present invention. On the other hand, the positive and negative electrode layers can be prepared by mixing the electrode active material particles, the electrolyte particles or the electrolyte short fibers and solvent, and a binder if necessary, and especially a conductive agent for the positive electrode to make the slurry, and to laminate the electrode layers in thin layers by die-coating, roll-coating, curtain-coating, screen-coating, or the like, which can speed up the process. Similarly, the electrolyte layer can be also formed. It is also possible to form the laminated structure by particulating and then attaching the desired slurry, solvent, or binder solution with low solid content in an impact manner to the interface with the positive electrode layer, electrolyte layer, negative electrode layer or current collector only.

Furthermore, the present invention is not limited to a single slurry containing multiple types of particles, especially for electrodes, but various slurries can be made and the corresponding heads can be used. For example, when electrode particles and electrolyte particles which have different specific weights and particle diameters each other can be mixed to make a slurry without binder or with a small amount of binder, sedimentation will occur over time or instantaneously no matter how uniformly the slurry is mixed, and dispersion state will change. An ideal laminated structure for the electrodes can be obtained by separately preparing the slurry containing mainly the electrode active material particles and solvent, and the slurry containing mainly the electrolyte particles or fibers and solvent, setting the amount of spray at the desired ratio for each, and laminating each slurry over and over in a thin film in the desired overlapping, for example, alternating layers. This method is also effective for laminating the desired distribution of the conductive agents such as carbon particles and carbon nanofibers and the active materials with different specific gravity and particle size, which differ greatly in their ratio per volume. Too little or much of the conductive agent per unit volume of the electrode layer will affect the performance, so it is far better than applying it as a slurry mixed with the active material. In addition, binders of inorganic or organic particles or fibers, resin-based powders or short fibers such as PTFE and PVDF, binders of electrolytic glass-based short fiber or the like and solvents, resin-based solutions, emulsions or the like can be mixed to make independent a slurry and can be applied to desired locations in desired quantities.

In particular, if a slurry with a lower solid concentration (e.g., 10% or less) derived from the conductive agent is made into a thin film and laminated over and over so as to get entangled on the electrolyte and active material particles, the amount of the application per unit area becomes more uniform, leading to improved battery performance Furthermore, in the present invention, a strong adhesive can be partially applied to silicon particles or the like to prevent performance degradation due to expansion and contraction of silicon and silicon oxide particles, which are effective for the negative electrode. In other words, a slurry containing the silicon particles and solution or emulsion of the strong adhesive and resin particles or fibers can be made into particles by separate heads and laminated to form an electrode layer by partially attaching them to the silicon surface as adhesive particles. In particular, a pulsed method with impact is the best way to splay the adhesive or change it into fine particulate to transfer and partially adhere to the silicon surface. It is also possible to add carbon particles of the negative electrode active material to the adhesive solution or emulsion of the adhesive to make a slurry for the application.

The object can also be heated. The heating temperature is preferably between 30 and 150° C. By heating the object, the solvent content in the particulate slurry can be evaporated at the same time as it contacts with and wets the object. The time required to evaporate 95% of the solvent is preferably within 5 seconds, ideally within 2 seconds. The longer the time, the more likely the group of high-density particles deposited by the impact are loosened by the solvent. Also, if all of the solvent evaporates instantly upon the impact, solvent vapor can easily scatter the spray particles and cause the binder to boil.

In the present invention, when the slurry is converted into particles and adhered to the object in a pulsed manner, the impact can increase. In particular, in the air spray method, which is known in the industry as a two-fluid spray, the mass of the air surrounding the sprayed particles is 400 to 600 times greater than usual, so particles arriving later on the object are pushed back by the rebounding air on the object, resulting in loss of impact and extremely poor particle adhesion efficiency. On the other hand, in the impact pulse method in which both slurry and air are applied in a pulsed manner, compressed air between a spray particle cluster and another spray particle cluster diffuses, and only the directional particles move and adhere. As a result, it is also economical because of an adhesion efficiency of more than 95%, compared to about 30-50% for ordinary sprays. By using the pulsed spraying, for example, the amount of the conductive agent to be applied can be reduced to less than one-tenth of that of normal spraying when adjusting the ratio of conductive agent to the electrolyte or the electrode active material, which is extremely convenient.

As described above, the present invention can be used to produce an all-solid-state battery with high performance

DETAILED DESCRIPTION

Now, a preferred embodiment of the present invention will be described with reference to the drawings. However, the embodiment below is only an example for facilitating the understanding of the present invention. Addition, replacement, deformation, or the like executable by those skilled in the art can be made thereto without departing from the technical idea of the present invention.

The drawings schematically show the preferred embodiment of the present invention.

Figure 1:
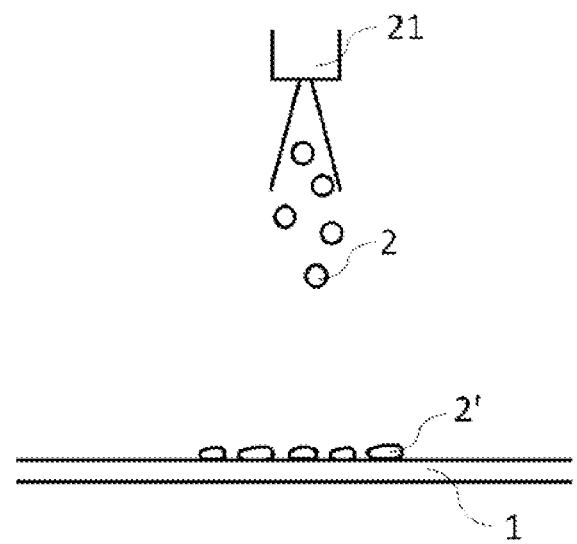
FIG. 1 shows a schematic diagram for active materials being splayed on an object (current collector), according to the present embodiment.

In FIG. 1, a slurry containing electrode active material particles and a solvent or a slurry containing active material particles, a solvent and a binder is sprayed from a spray head 21 onto a current collector 1 as an object, resulting that active material spray particles 2 are attached thereon. Any type of the active material particles can be used. When an electrolyte is made of sulfide, a positive electrode active material such as lithium cobalt oxide (LCO), lithium nickel manganese cobalt oxide (NMC), lithium nickel cobalt aluminum oxide (NCA) or the like reacts with sulfur, resulting that it is difficult for lithium ions to pass through. Therefore, the active material particles may be coated with a thin film of lithium niobate or other materials. The active material particles or electrolyte particles may be encapsulated with the electrolyte or the active material, respectively, which makes the process shorter and simpler, and thus more productive. Adhesion can be improved by pulsed spraying and attaching the spray particles to the current collector with impact at a high speed. The impact on the sprayed particles 2 is can be archived by keeping the distance between the object and the spray head close, e.g., 5 to 60 mm, and by pulsed splaying at a gas pressure of 0.15 to 0.3 MPa using a two-fluid nozzle with a splay pattern of a narrow splay angle, e.g., at 30 degrees or less, preferably 20 degrees or less. The number of pulses per second is preferably 10 Hz or higher for productivity. The shorter the distance and the narrower the splay pattern angle, the higher the impact. A slurry containing mainly the electrolyte particles and solvent may be sprayed first. It is preferable that a room where the spray is applied such as a booth, is under exhausted conditions. If the electrolyte is sulfide, the supplied gas should be dehumidified. The lower a dew point temperature, the better the dehumidification. For example, an all-solid-state battery with almost no hydrogen sulfide and good performance can be produced at a temperature of minus 100 degrees Celsius. For materials that need to avoid oxidation, a heating process, for example, may be performed under an inert gas (e.g., argon) atmosphere to suppress oxidation reaction if necessary.

Figure 2:
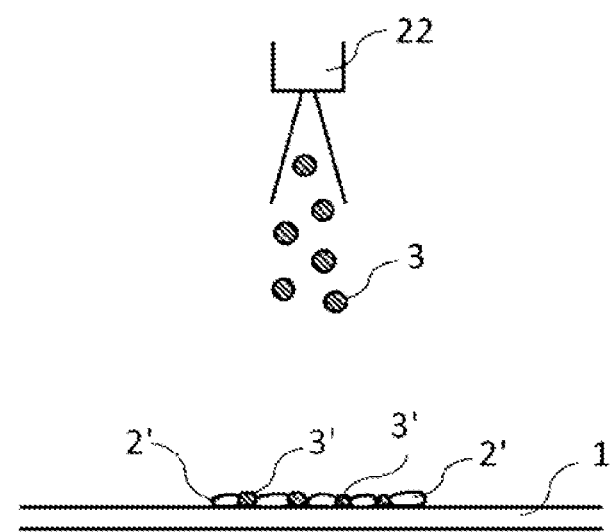
FIG. 2 shows a schematic diagram for electrolyte particles or different (e.g., conductive agent) particles being splayed onto the active material particles attached on the object, according to the present embodiment.

FIG. 2 shows dispersed coating of particles 3 and 3' in a thin film by splaying a slurry (containing, e.g., electrolyte particles) different from that of FIG. 1 around and on top of the thin film (e.g., made of an active material 2') with a head 22. The splay of the active material from the head 21 in FIG. 1 and the splay of the electrolyte from the head 22 may be alternated to build up many layers in a thin film. Instead of or in addition to the electrolyte particles, a solution or slurry including a conductive agent such as lithium iodide or at least one conductive agent selected from the group consisting of carbon particles, carbon nanofibers and carbon nanotubes, or a slurry of the mixture of them with the active material for the electrodes or the electrolyte particles is sprayed from the spray head 22 and then the sprayed particles 3 are adhered. Pore carbon and nanocarbon with large surface area, which is the conductive agent, are excellent. For example, when it has 2,000 square meters per gram or more in BET plot, and preferably 3,500 square meters or more, the electrode performance can be improved by encapsulating the sulfur or the active materials in the positive electrode and nano-level silicon in the negative electrode, in the nano-level pores in advance.

Figure 3:
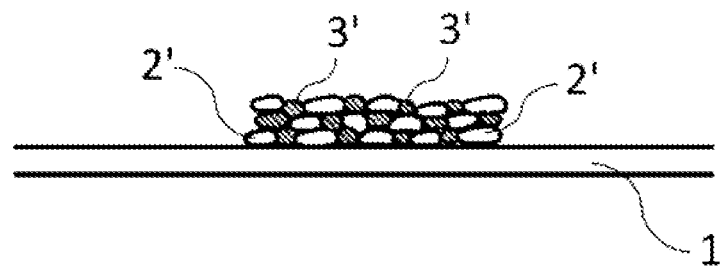
FIG. 3 shows a schematic cross-sectional view of two types of particles laminated together, according to the present embodiment.

In FIG. 3, the electrode active materials 2' and electrolyte particles 3' are laminated alternately. Weight ratio per unit area of each can be freely selected, and the ratio can be easily adjusted by selecting the number of pulses, especially by performing pulsed spraying. Furthermore, a different spray head can be used to disperse and apply the desired amount of conductive agent around the electrolyte and electrode active material to achieve the adhesion.

Figure 4:
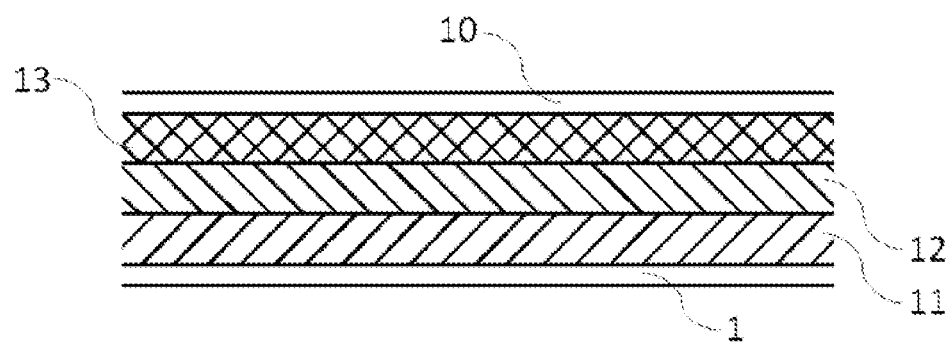
FIG. 4 shows a schematic cross-sectional view of a current collector, positive electrode layer, electrolyte layer, negative electrode layer, and current collector laminated together, according to the present embodiment.

In FIG. 4, a positive electrode layer 11 and a negative electrode layer 13 are laminated on both sides of an electrolyte layer 12, and the electrodes 11 and 13 are sandwiched between the current collectors 1 and 10. A laminated structure for the all-solid-state battery is completed by pressing it under heated condition or at room temperature. As the current collector, aluminum foil and copper foil are generally used for the positive electrode and the negative electrode, respectively, but not limited thereto, stainless steel sheet may be used depending on the types of the active material and electrolyte.

Figure 5:
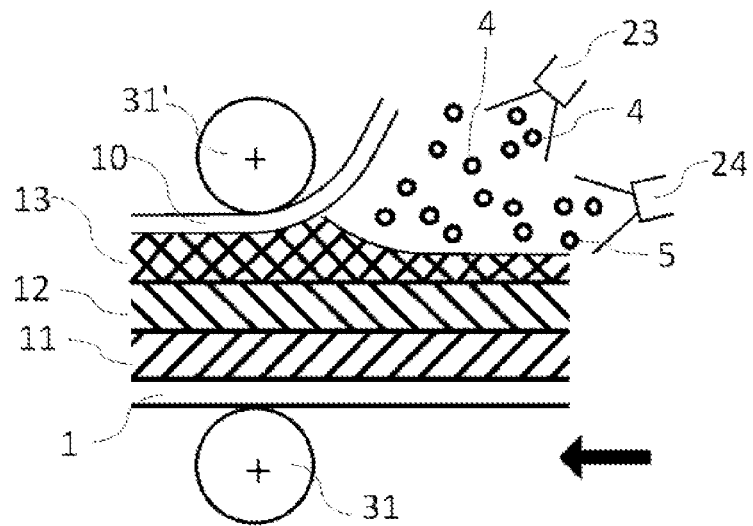
FIG. 5 shows a schematic cross-sectional view of electrode slurries being splayed onto the objects (current collector and electrolyte layer), according to the present embodiment.

In FIG. 5, an electrolyte slurry and a negative electrode active material slurry are alternately sprayed from the spray heads 24 and 23, respectively, to form the negative electrode layer on the positive electrode current collector 1, the positive electrode layer 11, the electrolyte layer 12 and on the negative electrode current collector, and then pressing is performed using rolls 31 and 31'. When this pressing is performed in the subsequent process, the pressing pressure can be almost none or low. The rolls may be heated, and the current collector, electrode layer, and electrolyte layer may also be heated in advance to promote the volatilization of the solvent contained in the sprayed particles 4 and 5.

Figure 6:
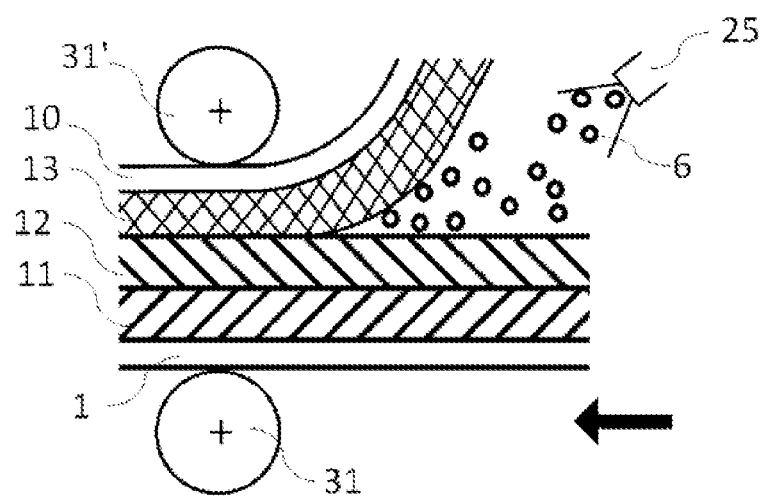
FIG. 6 shows a schematic cross-sectional view of the splay on the objects (electrolyte layer and electrode layer), according to the present embodiment.

In FIG. 6, the electrolyte slurry, an electrode active material slurry or both is sprayed to the interface between the electrolyte layer 12 and the negative electrode layer 13 with a spray head 25. A slurry containing the electrolyte particles and electrode active material may also be sprayed. It is also possible to increase adhesive strength of the interface by spraying the solvent or the like to instantly swell the binder or the like at the respective interface. It is moved by the rolls 31 and 31' with or without the pressing pressure. There is no limit to the load, diameter, or number of press rolls.

Figure 7:
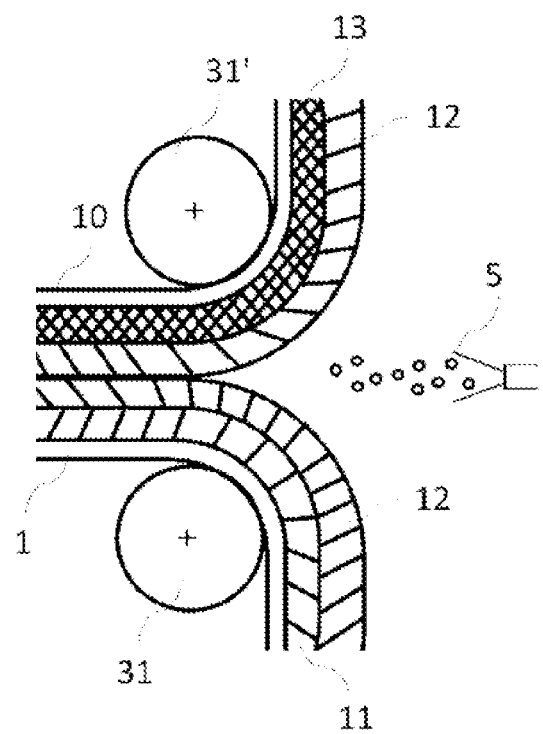
FIG. 7 shows a schematic cross-sectional view of the splay on the object (electrolyte layer), according to the present embodiment.

In FIG. 7, the slurry for the electrolyte layer or the solvent is sprayed onto the electrolyte layers formed on both the positive and negative electrode layers on flexible current collectors. The effect is as described above. A separately manufactured electrolyte thin plate or a flexible electrolyte membrane with which a porous substrate is filled can be sandwiched between the positive and negative electrodes without the electrolyte layer. In this case, the electrolyte slurry, each active material slurry, binder solution, or solvent can be applied to the surface of the electrolyte or each electrode to improve the adhesion.

Figure 8:
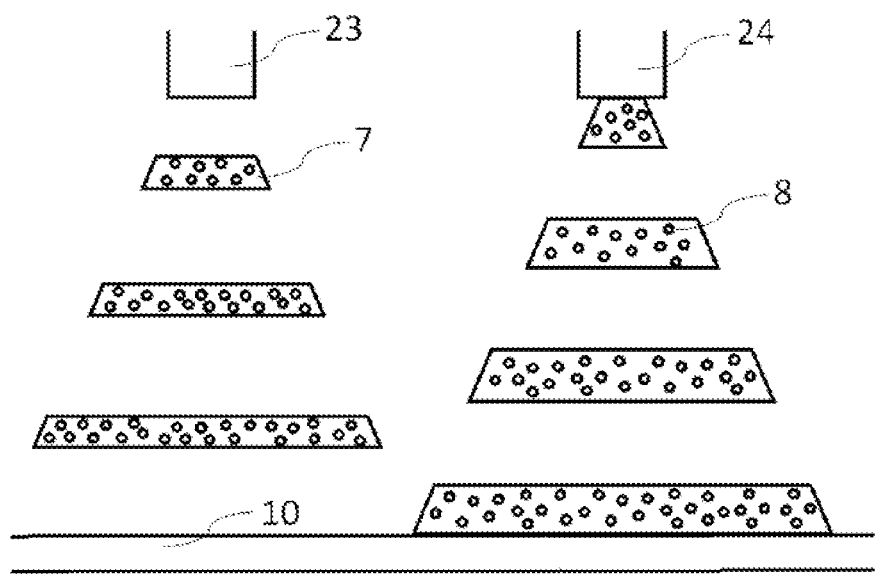
FIG. 8 shows a schematic cross-sectional view of the lamination by the alternated splaying of different materials onto the object (current collector) in a pulsed manner and with a time difference, according to the present embodiment.

In FIG. 8, the negative electrode active material slurry is sprayed onto the negative electrode current collector 10 from the spray head 23 in a pulsed manner to form sprayed particle clusters 7. On the other hand, the electrolyte slurry is pulsed sprayed from the spray head 24 to form sprayed particle clusters 8, and each sprayed particle cluster is alternately laminated on the negative electrode current collector. Preferably, it is thin and multi-layered. Similarly, a slurry containing mainly the positive electrode active material and solvent and a slurry containing mainly the electrolyte and solvent can be alternately laminated on the positive electrode current collector. Furthermore, an additional head, not shown in the figure, can be used to splay a small amount of conductive agent slurry in a pulsed manner alternately from the head 23 or 24. If the electrolyte is sulfide, these operations should be performed under a sufficiently dehumidified environment where hydrogen sulfide is not generated. The object may be a long R to R current collector or porous sheet, or it may be a single leaf current collector, a porous sheet or a sheet with an electrode formed on a current collector. The electrode may have a periphery formed by intermittent coating with a slot nozzle to weld tabs or other components at the end of the current collector by a laser beam. Masks can also be used in spraying, and perimeter can be formed by the application at close range.

In the embodiment, slot nozzles can be used to apply the slurry at high speed to an object as wide as, for example, 1500 mm in order to increase the productivity. In addition, a head group including 100 to 200 spray heads arranged in one or more rows orthogonal to the direction of movement of the object can spray or pulsed spray with impact. If necessary, the head group can be moved back and forth (swung) in the head arrangement direction by, for example, 15 mm to sufficiently lap a pattern of, for example, 15 mm. The heads can be arranged for the required type of the slurry and for the desired number of laminations to meet the required speed.

The structure of the head can be simplified by using a wide roll with grooves, for example, every 10 millimeters in the width direction (disclosed in JPH08-309269A, of which inventor is the same as the present inventor). By rotating this roll with the grooves filled with the slurry, the slurry is be converted into particles by compressed gas, which can be adhered to the object. The speed of the object can theoretically be 100 meters per minute or more. Preferably, the number of roll devices to be placed orthogonal to the direction of movement of the object is determined according to the type of the slurry and the number of laminations. The technology disclosed by JPH06-86956A of which inventor is the same as the present inventor can also be used. A cylindrical screen or seamless belt with a width wider than the width of the object, equipped with numerous through holes (e.g., 150 micrometer diameter holes) filled with the slurry, may be used. When this cylindrical screen or seamless belt faces the object, the slurry is converted into fine particles to spray them by liquefied or compressed gas and evenly adhere to the entire surface of the object. Instead, a commercially available rotary screen for screen printing can be used to reduce the cost. The same effect can also be obtained by using a cylindrical pipe wider than the object, for example, with staggered holes of about 0.3 mm or 0.5 mm in diameter with a pitch of 1.5 mm. For the above two methods, the distance between the object and the location where the particles are blown out should be between 5 and 70 millimeters to improve the impact effect. In the above two methods which also double as a volumetric feeding method, the line can be followed by changing the rotation speed, so there is no need for expensive pumps or controllers, and in the roll-to-roll process of a roll coater or rotary screen printer, equipment can be placed or manufacturing can be performed.

In this embodiment, the slurry may be converted into particles and moved by pressure difference, and the particling may be done by inkjet. It can also be converted into particles by a disc or bell rotating atomizer used in the general coating field. Other methods such as atomization with a bubbler or ultrasonic waves and further refinement by hitting a rotating roll at close range with a spray stream are also acceptable. A particle group converted into particles may be transferred by carrier gas and attached to the object by differential pressure. The movement may be done in pulses to increase the adhesion efficiency and impact.

INDUSTRIAL APPLICABILITY

According to this embodiment, an all-solid-state battery with low interfacial resistance and high adhesiveness, which has a laminated structure including electrolyte, electrodes, and current collectors, can be manufactured with high quality.

DESCRIPTION OF THE REFERENCE NUMERAL

1 Positive electrode collector
2, 4 Sprayed particle of electrode active material
2' Electrode active material
3, 5 Sprayed particles of electrolyte
3' Electrolyte particles
6 Sprayed particles of solvent
7 Sprayed particle cluster of electrode active material
8 Sprayed particle cluster of electrolyte
10 Negative electrode collector
11 Positive electrode layer
12 Electrolyte layer
13 Negative electrode layer
21, 22, 23, 24, 25 Spray head
31, 31' Roll

What is claimed is:

1. A method for manufacturing an all-solid-state battery by forming electrode layers on positive and negative current collectors for the all-solid-state battery, forming an electrolyte layer on at least one of the electrode layers, and sandwiching a positive electrode layer, the electrolyte layer, and a negative electrode layer between the positive current collector and the negative current collector and in contact with each other or sandwiching the electrolyte layer between the electrode layers to form a laminated structure, comprising:
a preparing step;
a lamination step;
wherein in the preparing step, a slurry containing electrode active material and solvent, and a slurry containing electrolyte particles or electrolyte fibers and solvent are prepared,
in the lamination step, at least two slurries are alternatively applied to the current collector in a film to stack each slurry so that two or more layers are formed, and
a conductive agent is prepared so as to be contained in an independent slurry and applied on the electrolyte particles or fibers or on the electrode active material in a state where particles or fibers of the conductive agent are dispersed so that the particles or the fibers of the conductive agent do not form a film.

2. The method of claim 1, wherein 2 to 15 layers are formed in the lamination step.

3. The method of claim 1, wherein one of the slurries is a slurry for the positive electrode layer, and the slurry for the positive electrode layer contains a conductive agent.

4. The method of claim 1, wherein the slurry containing electrode active material and solvent, and/or the slurry containing electrolyte particles or electrolyte fibers and solvent contain an inorganic or organic binder.

5. The method of claim 1, wherein the electrolyte layer is formed by laminating and applying the electrolyte layer slurry on the positive electrode layer or the negative electrode layer formed as the electrode or on a porous sheet for the electrolyte in a thin film.

6. The method of claim 1, wherein at least one of the electrode and electrolyte layer is formed by a spray method or the electrode or electrolyte layer is formed by converting the slurry into particles, and moving and applying the slurry in a particulate form on a heated collector, electrode layer, and porous sheet of the object to be applied, and then volatilizing 95 percent or more of the solvent within five seconds after splayed particles or particles of the slurry adhere to the object.

7. The method of claim 6, wherein spraying is done in pulses of 1 to 1000 Hz, the distance between the object and spray head is 5 to 60 mm, and impact of the spray particles of the slurry on the object causes the solvent to evaporate while the solvent and non-volatile components in the slurry are instantaneously separated.

8. The method of claim 1, further comprising: forming a negative electrode on the negative current collector; and forming a positive electrode on the positive current collector.

9. The method of claim 8, wherein the all-solid-state battery is manufactured in a roll-to-roll manner.

10. The method of claim 8, further comprising: forming the electrolyte layer on the negative electrode or the positive electrode.

11. The method of claim 1, further comprising: forming the electrolyte layer with a porous base material as a backbone to laminate the electrolyte layer between the negative electrode layer and the positive electrode layer.

* * * * *